United States Patent [19]

Martinez et al.

[11] 4,016,081
[45] Apr. 5, 1977

[54] STAGED MEMBRANE DIFFUSION DEVICE AND MEMBRANE SUPPORT

[75] Inventors: F. Jesus Martinez, Palatine; William J. Schnell, Arlington Heights, both of Ill.

[73] Assignee: Baxter Laboratories, Inc., Deerfield, Ill.

[22] Filed: Apr. 22, 1974

[21] Appl. No.: 462,674

[52] U.S. Cl. .................................. 210/321 B
[51] Int. Cl.² ........................................ B01D 31/00
[58] Field of Search ............. 210/321; 55/16, 158; 23/258.5

[56] References Cited

UNITED STATES PATENTS

| | | | |
|---|---|---|---|
| 3,411,630 | 11/1968 | Alwall et al. | 210/321 |
| 3,511,381 | 5/1970 | Alwall et al. | 210/321 B |
| 3,520,803 | 7/1970 | Iaconelli | 210/321 X |
| 3,534,860 | 10/1970 | Dibelius et al. | 210/321 |
| 3,540,595 | 11/1970 | Edwards | 210/321 |
| 3,788,471 | 1/1974 | Buchmann et al. | 210/321 X |
| 3,834,544 | 9/1974 | Tyson, Jr. et al. | 210/321 |
| 3,920,555 | 11/1975 | Johansson | 210/321 A |

FOREIGN PATENTS OR APPLICATIONS

| | | | |
|---|---|---|---|
| 1,593,273 | 5/1970 | France | 210/321 |
| 7,403,535 | 3/1974 | Netherlands | 210/321 B |

Primary Examiner—Frank A. Spear, Jr.
Attorney, Agent, or Firm—Paul C. Flattery; David A. Anderson

[57] ABSTRACT

A diffusion device is disclosed made from a stack of pairs of semi-permeable membrane walls and plate members positioned between adjacent membrane wall pairs for support thereof. Flow conduits extend transversely of the stack in communication with flow passages between the membranes or between each membrane and each adjacent plate member. In accordance with this invention, staging means are provided for directing fluid in the flow passages successively along different membrane wall pairs to lengthen the fluid path of flow for improved diffusion. The staging means comprises an occluding member in the transversely extending flow conduits, positioned to redirect flow received from along one membrane wall pair along another membrane wall pair.

15 Claims, 13 Drawing Figures

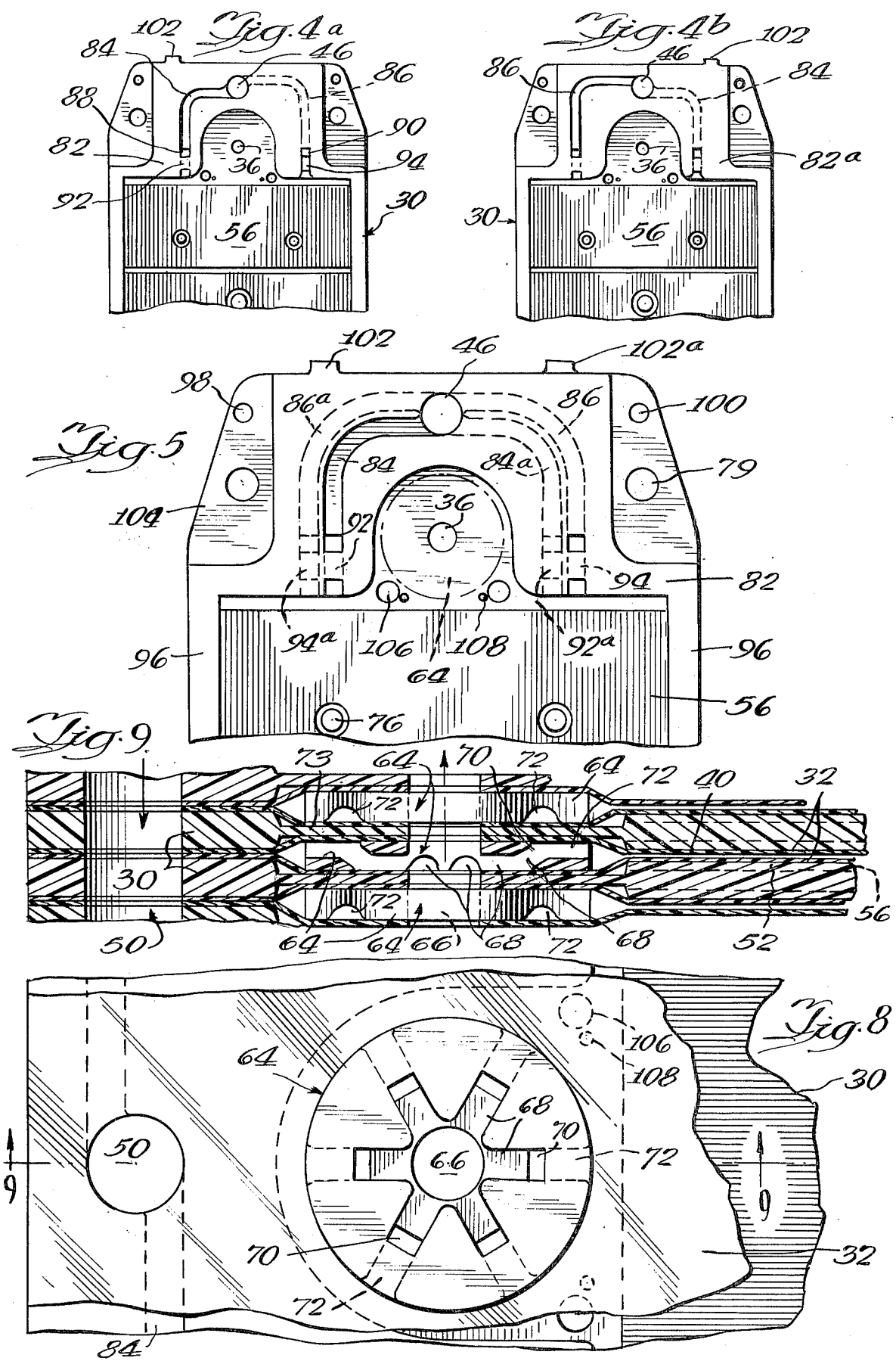

STAGED MEMBRANE DIFFUSION DEVICE AND MEMBRANE SUPPORT

BACKGROUND OF THE INVENTION

Membrane diffusion devices are used for a variety of purposes, particularly for the dialysis or oxygenation of blood, in the first instance to remove toxic waste products from the blood in the manner of an artificial kidney, and in the second instance to function as an artificial lung.

There are two major classes of membrane diffusion devices: the first class is the coil type diffusion device in which a long, tubular diffusion membrane is wrapped in a coil with membrane support material to provide a long blood flow path through the tubular membrane of the device. An example of this is the well-known coil dialyzer manufactured by Travenol Laboratories, Inc. of Deerfield, Illinois.

The second major type of diffusion device is the flat plate type in which flat sheets of membrane are placed alternatingly in a stack between flat membrane support members. The blood flow path through this second device is relatively short, but a large number of separate blood flow paths are provided in parallel arrangement when a high capacity diffusion device is desired. An example of this device is the Kiil dialyzer.

Both of these major types of diffusion devices have their respective advantages and disadvantages. A chief advantage of the coil dialyzer is the long blood flow path, which permits complete diffusion for the blood or other material to which the diffusion device is to be applied. Hence, coil dialyzers provide an excellent clearance of urea, creatinine and the other waste products from the blood.

The flat plate type diffusion devices, however, may be compact, and can have a high flow capacity. Furthermore, dialyzers made in accordance with this design are more readily used with the "single pass" technique of passing dialysis solution through the device and then disposing of it, rather than recirculating part of the spent dialysis solution, as is typically done with coil type dialyzers. However, because of the relatively short blood flow path through the flat plate type diffusion devices, their capacity to remove the unwanted waste products from the blood (or other material desired to be processed) is restricted, because of too short a fluid transit time and ordinary membrane-solute diffusion resistance.

In accordance with this invention, a diffusion device is provided which combines the advantages of the coil type diffusion device with the flat plate type diffusion device, in that a long blood flow path is provided in a flat plate diffusion device by a technique which is readily capable of commercial use. Furthermore, by this invention, essentially the same design of flat plate diffusion device can be easily modified to provide a blood flow path, as well as a dialysis solution or oxygen flow path, which can be of any desired length and flow capacity, with only very simple modification of the assembly process of the dialyzer of this invention.

Furthermore, in accordance with this invention, a novel membrane support plate design is disclosed which provides improved sealing and manifolding of fluid into and out of the diffusion device.

DESCRIPTION OF THE INVENTION

In accordance with this invention, a diffusion device such as an artificial kidney is disclosed which comprises a stack of pairs of semipermeable membrane walls, said pairs defining a set of first flow passages along interior surfaces thereof, and supporting plate members (which may also be screens or the like) positioned between adjacent membrane wall pairs for support thereof and to define a set of second flow passages along exterior surfaces of said membrane wall pairs. Means are provided for permitting communication of the flow passages with the exterior of the device, which means include flow conduits extending transversely of the stack in communication with one of the sets of flow passages mentioned above. In accordance with this invention, staging means are provided for directing fluid in at least one of the sets of flow passages mentioned immediately above successively along different membrane wall pairs, to lengthen the fluid path of flow through said set of flow passages for improved diffusion. The staging means comprises occluding members positioned in the transversely extending flow conduits to redirect flow received from along one membrane wall pair along another membrane wall pair.

Typically, the transversely extending flow conduits described above are defined by first open ports defined through the plate members and membrane walls and positioned to be in registry with each other in the stack of plates and membranes. The occluding member preferably simply comprises an intact, port-free surface of a membrane wall which is placed in registry with a transversely extending flow conduit. This is typically accomplished as the stack is built by, at predetermined intervals, inserting a membrane into the stack which does not have a port at the appropriate position as the remaining membranes have. The functioning and result of this port-free surface is described in greater detail below, but its basic purpose is to redirect flow of fluid coming from along a membrane pair back along another membrane pair to lengthen the flow path, and accordingly render the diffusion processing of the fluid in the flow path more efficient.

Typically, several membranes which present an intact, port-free surface in registry with the transversely extending flow conduits are disposed in the diffusion device at predetermined intervals, to provide a fluid flow path through the diffusion device which defines an elongated, zig zag shape, to provide diffusion of a maximum desired efficiency in the plate type diffusion device.

The plate members of the diffusion device of this invention typically have a profiled surface on both sides thereof for providing channels for the flow of fluid along the plate members. Preferably, novel sealing channel means are provided at each end of the plate member which function in a manner to be described below.

In the drawings:

FIG. 4a is a fragmentary plan view of one end of the plate of FIG. 3.

FIG. 4b is a fragmentary plan view of the same end of the plate of FIG. 3 turned over on its other side.

FIG. 5 is a fragmentary plan view of two plate members of the type shown in FIG. 3 stacked together in position of use, showing the respective arrangement of the dialyzate flow channels in the stack.

FIG. 8 is a fragmentary plan view of a stack of plate members and associated membranes, and sealing means for the flow path passing between membrane pairs.

FIG. 9 is a sectional view taken along Line 9—9 of FIG. 8, with some portions shown in elevation.

Figure 1:
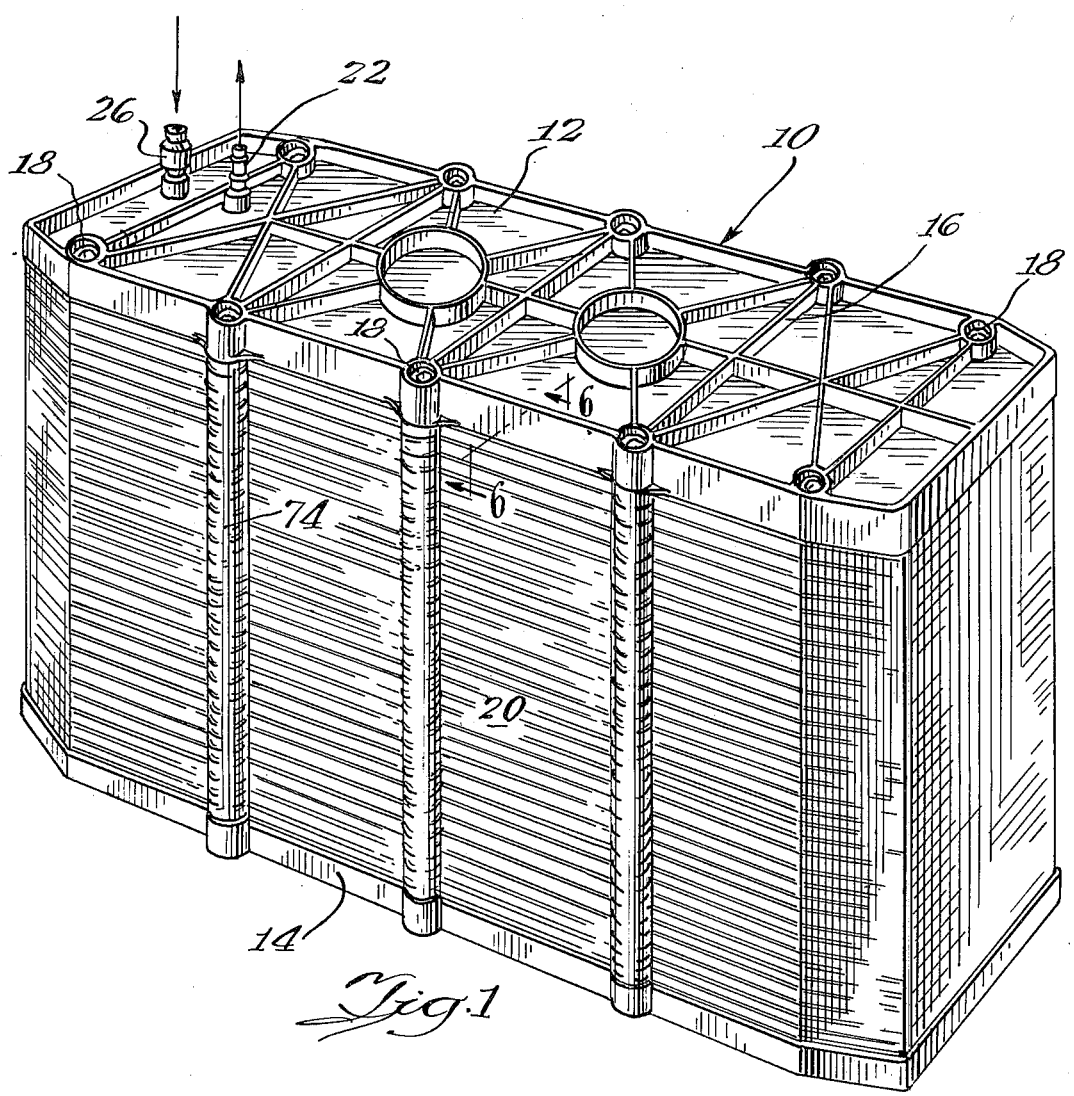
FIG. 1 is a perspective view of a membrane diffusion device made in accordance with this invention, intended for use as a blood dialyzer.
Figure 12:
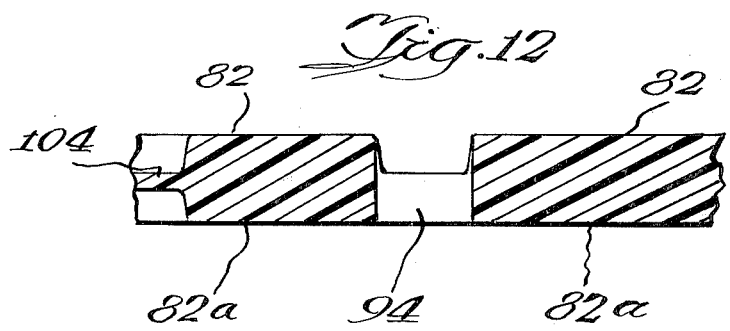
FIG. 12 is a sectional view taken along Line 12—12 of FIG. 3.

Referring to FIG. 1, a diffusion device for use as a blood dialyzer or artificial kidney is shown, although with a simple modification of the type of membrane used a blood oxygenator could be made from the same or a similar design. Furthermore, other materials besides blood can be dialyzed in the unit of this invention.

Dialyzer 10 is shown to include top and bottom reinforcing plates 12, 14, both of which have integral reinforcing members 16 for providing added rigidity to the plate. Plates 12, 14 are held together by bolts 18 to provide a substantial pressure seal on the stack 20 of plates and membrane pairs, which are tightly enclosed between reinforcing plates 12, 14. The number of plates and membrane pairs used varies with the membrane surface desired. A typical number could be about 34 plates and 33 membrane pairs.

Figure 2:
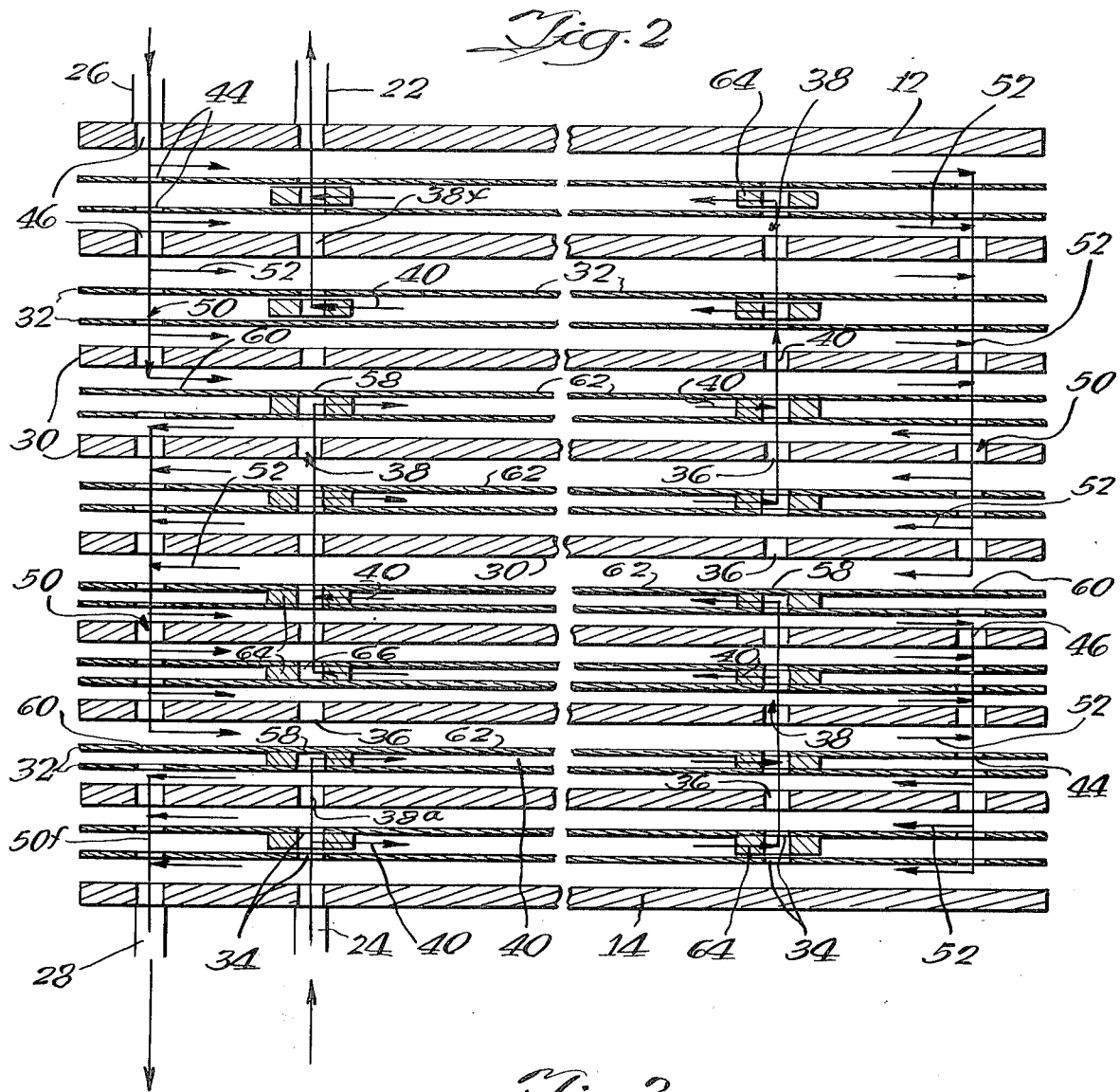
FIG. 2 is a schematic cross-sectional view of the blood dialyzer of FIG. 1, showing the blood flow path and dialysis solution flow path through the dialyzer, with the number of plates and membrane pairs present being reduced, and the members expanded vertically, for clarity.

Blood outlet 22 is shown in FIG. 1, with blood inlet 24 being shown in FIG. 2 in a position on plate 14 corresponding to the position of outlet 22 on plate 12. Correspondingly, dialysis solution inlet 26 is shown in FIG. 1, and the corresponding outlet 28 on plate 14 is shown in FIG. 2. Accordingly, it can be seen that the dialyzer specifically shown is a counter-current flow type dialyzer, although co-current flow diffusion devices can also be constructed in accordance with this invention.

Figure 10:
FIG. 10 is a plan view of the staging type of membrane used in the diffusion device of this invention.
Figure 11:
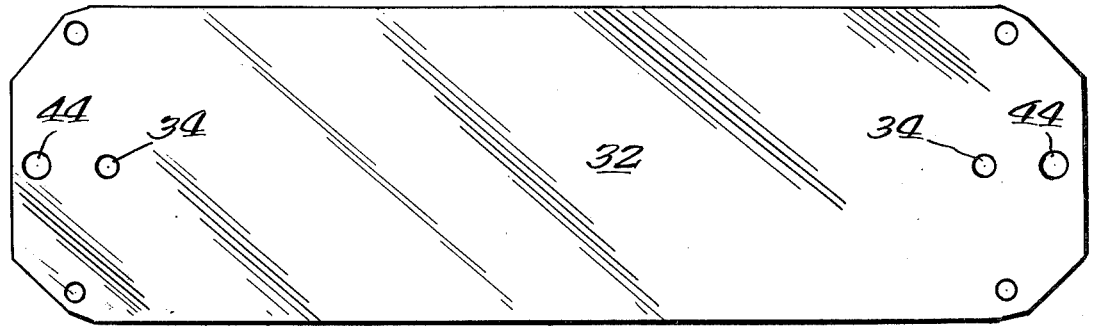
FIG. 11 is a plan view of another type of individual membrane unit used in the diffusion device of this invention.

Referring to FIG. 2, it can be seen that the dialyzer specifically disclosed herein is a stack of plates 30, each being separated by a pair of membranes 32. Typically, the majority of membranes 32 are shaped as shown in FIG. 11, and a minority are shaped as in FIG. 10.

For dialyzers, membranes 32 are generally made out of cellulose film, such as that film made by the copper-ammonia process. Plates 30 may be made out of high density polyethylene or the like, and the presently preferred design is shown in FIG. 3.

Membranes 32 define a set of inner ports 34 at opposite ends of the membrane which register with inner ports 36 of plates 30 when the plates and membranes are arranged in the stack as shown in FIG. 2. Inner ports 34, 36 define a first set of flow conduits 38 extending transversely of the stack, which communicate directly or indirectly with blood inlet 24 and blood outlet 22. The path of blood flow therefore runs from blood inlet 24 through the transversely extending conduit section 38a associated with it, and from there in a branched, parallel flow path alternating between membrane pairs 32 and other transverse conduit sections 38, in a path of flow 40 to be described more fully below, until a final, transversely extending flow conduit section 38f is reached from which the blood is collected and passes out of blood outlet 22. The central portion of the plates 30 and membranes 32 are not shown in FIG. 2, so that the membrane-contacting portions of the blood flow path 40 are longer than is indicated in that Figure.

Correspondingly, the dialyzate solution enters inlet 26 and passes through outer ports 44 of the membranes and outer ports 46 of the plates which, when stacked together, are also in registry to create a second set of transversely extending flow conduit sections 50. The dialyzate solution enters inlet 26 and passes through transversely extending flow conduit sections 50, being manifolded, by a means to be described later, into second flow passages for dialyzate between each membrane 32 and its neighboring plate 38 in a path of flow 52 as illustrated, to pass alternatingly through conduit sections 50 and second flow passages. The dialysis solution is then collected in a final transversely extending flow conduit section 50f for conveyance through outlet 28. Blood passing through flow path 40 between membranes 32 encounters a counter-current flow of dialysis solution between each membrane and plate, for efficient diffusion exchange through the membranes.

Figure 3:
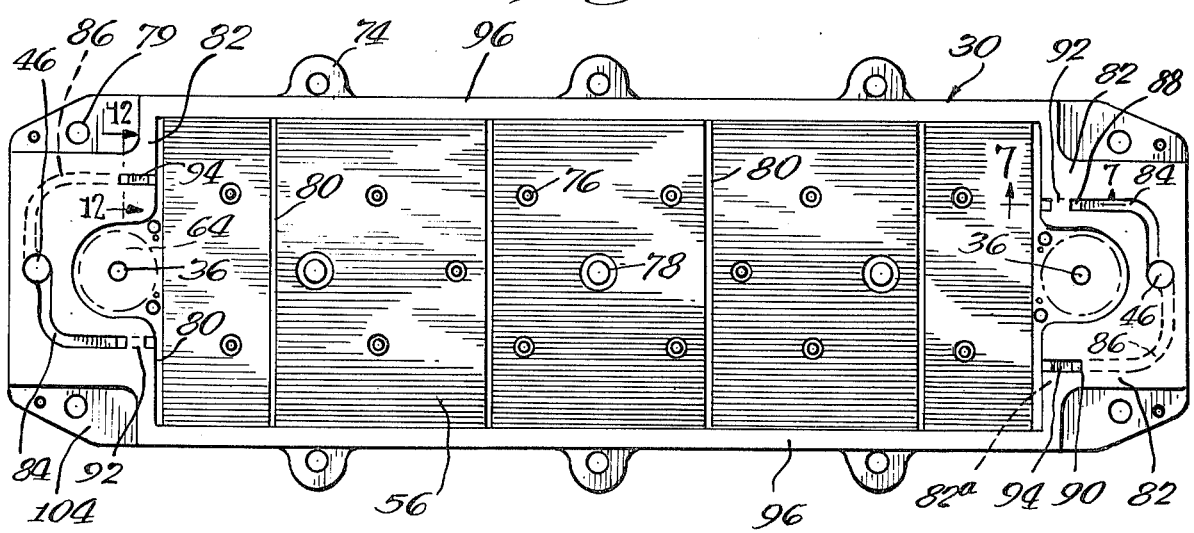
FIG. 3 is a plan view of a plate member used in the blood dialyzer of FIG. 1.

Referring to FIG. 3, plate 30 defines a profiled surface 56 on each side thereof to facilitate the flow of dialysis solution along the flow path between the plate surface and its adjacent membrane 32. Profiled surface 56 may consist of a number of small grooves, preferably about 0.04 inch wide and 0.03 inch in depth, extending from end to end of the plate. The grooves may be parallel as shown herein, or they may be of crossing arrangement to create an array of individual pedestals and crossing flow paths for optimum mixing of the dialysis solution. The inner faces of plates 12, 14 may also be similarly profiled, if they lie against a membrane and not a plate.

In accordance with this invention, staging means is provided to the diffusion device of this invention for directing fluid in either or both of flow paths 40, 52 successively along different membrane wall pairs, to lengthen the fluid flow path through the flow passages for improved diffusion. As specifically shown here, the staging means uses an occluding member which is an intact, port-free surface 58, 60 in several membrane walls where the corresponding membranes have inner ports 34 and outer ports 44. These port-free membranes are staging membranes 62, and are of a structure as shown in FIG. 10. Staging membranes 62 have only a single set of ports 34, 44, and are preferably spaced from each other by a plurality of regular membranes 32 (FIG. 11), to provide a flow path through the diffusion device which comprises a plurality of separate flow passages within different membrane pairs in parallel flow arrangement. Also, staging membranes 62 are arranged in the stack, as shown in FIG. 2, so that every fourth membrane is a staging membrane. This provides two parallel, membrane-contacting flow channels for blood. If a greater number of parallel flow channels is desired, the staging membranes 62 can be separated by more normal membranes 32 of the FIG. 11 type, while if a single, long flow channel is desired, the staging membranes can be used as one member of each membrane pair.

The staging membranes are arranged in the stack with the port-free surfaces 58, 60, being alternatingly positioned at opposite ends of the diffusion device. The result of this is to define flow paths 40, 52 of zig zag shape through the diffusion device as shown in FIG. 2.

In the alternative, the blood flow path 42 can be staged, of elongated and of zig zag shape, while staging membrane 62 can define in every instance an outer port 44 at both ends, so that each transversely extending flow conduit 50 will pass through the entire dialyzer without obstruction. Accordingly, dialysis solution will make a single pass across a membrane and plate flow path, and then pass from outlet 28. Under this circumstance, it will be necessary to move dialyzate outlet 28 to the other end of bottom reinforcing plate 14 to receive the dialyzate solution flow. Similarly, FIG. 2 shows a flow path for both blood and dialyzate involving four separate consecutive passes of the respective fluids across the plates and membranes as controlled by three staging membranes. If any odd number of consecutive passes is desired, it becomes necessary to move blood inlet 24 and dialyzate solution outlet 28 to the opposite end of bottom plate 14. Inlet 24 and outlet 28 can remain in the position as shown if any even number of consecutive passes across membranes 32 is desired.

Inner ports 34, 36 of the plates and membranes are sealed together to provide the leak-free, transversely extending flow conduit 38 for blood by elastomeric sealing members 64 (as shown in phantom in FIGS. 3 and 5, and in full lines in FIGS. 2, 8 and 9). Sealing member 64 has an aperture 66 which defines part of transversely extending flow conduits 38. Radiating from aperture 66 on one side of sealing member 64 are a plurality of grooves 68 for flow of blood outwardly from aperture 66. A port 70 is defined at the end of each groove 68, and communicates with a second groove 72 on the other side of sealing member 64. Accordingly, a sealing surface is provided on both sides of sealing member 64 while at the same time blood can pass from aperture 66, which is part of flow conduit 38, radially inwardly and outwardly into blood flow path 40 between pairs of membranes 32 without leakage. Sealing member 64 can be made of silicone rubber or similar material, and is seated between thin web portions 73 of plates 30 (FIG. 9).

It should be noted that in FIG. 9, a stack of plates and membranes including sealing members 64 are shown. The middle sealing member 64 is rotationally oriented in a different position from the upper and lower members, to give a view of the arrangement of the flow channels from various viewpoints.

Figure 6:
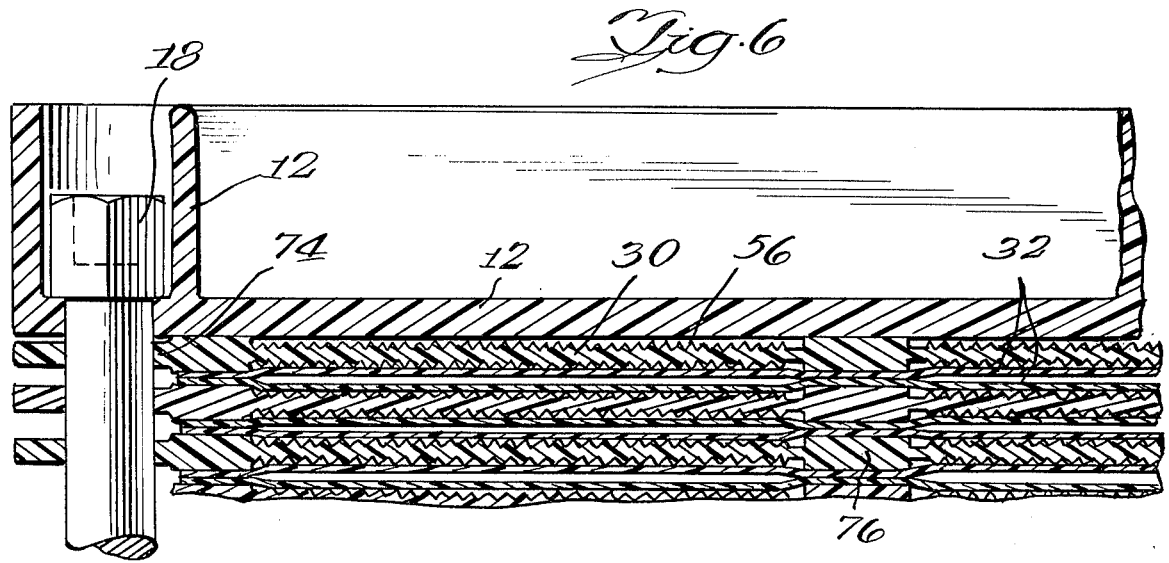
FIG. 6 is a fragmentary transverse sectional view taken through the stack of plates and membranes as shown in Line 6—6 of FIG. 1.
Figure 7:
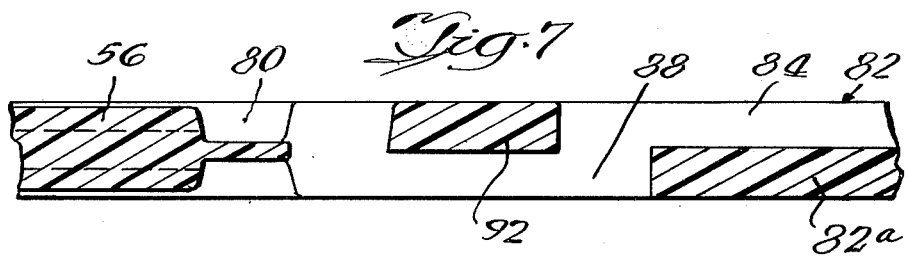
FIG. 7 is a sectional view taken along Line 7—7 of FIG. 3.

Referring to FIGS. 1, 3 and 6, ears 74 are shown through which bolts 18 pass to retain the plates and membranes of stack 20 in alignment. Also, studs 76, 78 are provided to abut against corresponding studs of adjacent plates to serve as a spacing means for the plates. Studs 78 serve the additional purpose of being the gate well location for the mold in which the plate can be molded, and can be dished in shape to avoid any remaining sharp pointed sprue of plastic from puncturing the membrane. Holes 79 at each corner of plate 30 are also for receiving a bolt 18 for clamping of stack 20.

Plate 30 also defines several transverse flow equalization grooves 80 which serve to readjust pressure differentials which may take place as fluids flow across the plates.

In accordance with this invention, a novel technique is utilized for passing fluid in transverse flow conduit 50, which is made up of ports 44 and 46, through the dialyzate flow path 52 between each membrane and each neighbor plate in leak-free manner. As shown in FIGS. 3 to 5 and FIG. 7, the sealing means for the connection between flow path 52 and second dialyzate transverse flow conduit 50 includes sealing shoulders 82, 82a on both sides of the plate member at opposite ends thereof. Flow grooves 84, 86 are defined on opposite sides of the plate member within the sealing shoulders. Grooves 84, 86 communicate at one end thereof with ports 46 of the plate.

Grooves 84, 86 communicate at their other ends with a flow aperture 88, 90 which passes entirely through plate 30 and thus provides flow communication with profiled surface 56 on both sides of plate 30. A sealing member 92, 94 bridges each aperture 88, 90. Each sealing member 92, 94 presents a sealing surface which is preferably coplanar with the sealing shoulder on that side of the plate member to which the connecting flow groove of the bridged flow aperture opens. In other words, the outer surface of sealing member 92 is coplanar with the outer surface of sealing shoulder 82 of the side of plate 30 shown in FIG. 3. The outer surface of sealing member 94, however, is coplanar with the outer surface of sealing shoulder 82a on the other side of plate 30. Accordingly, solution can flow from transverse flow channel 50 (aperture 46 in FIG. 3) through grooves 84, 86, into apertures 88, 90, under bridging sealing members 92, 94, into flow communication with profiled surfaces 56, passing between the membranes and their respective neighbor plates along flow path 52.

It is to be noted that flow grooves 84, 86 and their associated apertures and bridging, sealing members are asymetrically arranged relative to each other so that when adjacent plates are stacked together, the respective channels and associated parts can be assembled in a manner to avoid abutment. Accordingly, each bridging, sealing member 92, 94 presses each associated membrane pair against a flat surface of a sealing shoulder 82 or 82a on an adjacent plate. Accordingly, two such identical plates can be abutted together in a stack as shown in FIG. 5, in which channels 84, 86 of the upper plate do not abut the corresponding channels 84a, 86a of the next adjacent plate underneath it, which has been placed on the stack in inverted relation to the first plate. By placing adjacent plates on the stack in alternating, inverted relation, an entire stack of plates can be formed, pinching membranes between them, in which their respective bridging members 92, 94 of one plate member do not abut the bridging members of the next adjacent plate 92a, 94a, so that a tight seal of each bridging member pressing against a sealing shoulder surface is provided. In each case, blood between the membranes and dialysis solution between a membrane and a plate cannot escape between the ends of the plate because of the pressing action of the bridging members and sealing shoulders, which seal the membrane ends.

The sides of the stack 20 of plates and membranes are similarly sealed by sealing ridges 96 on both sides and faces of each plate 30, typically having a height equal to sealing shoulders 82, 82a. Ridges 96 are pressed together into sealing relation, with the edges of membranes 32 held between them, by the clamping action of bolts 18. Studs 98 and recesses 100 in plates 30 are provided on both sides as an assembly and alignment aid while stack 20 (FIG. 5) is being assembled. When properly oriented to each other in consecutive inverted relation, studs 98 will fit into recesses 100. Otherwise, stack 20 cannot be formed, as two abutting studs 98 will hold adjacent plates apart, which signifies improper assembly.

Tabs 102, 102a (FIG. 5) are provided on plates 30 to provide another visual orientation aid to determine that the plates of stack 20 are all properly aligned in consecutive inverted relation to adjacent plates to achieve the configuration of FIG. 5. Tab 102a is carried by the lower plate 30 in FIG. 5.

Thin portions 104 at the four corners of plates 30 are present to permit greater, focused, compression to be applied upon sealing shoulders 82, 82a and sealing ridges 96 for improved sealing.

Pedestals 106, 108 (FIG. 5) in plates 30 are provided on both faces of the plate for spacing of membrane 30 away from its associated plate, and for spacing of central portions of neighboring plates by abutment of pedestals 106, 108 against similar parts of neighboring plates.

The above has been offered for illustrative purposes only, and is not intended to limit the invention of this application which is described in the claims below.

That which is claimed is:

1. In a diffusion device which comprises: a stack of pairs of semi-permeable membrane walls, said pairs defining a set of first flow passages along interior surfaces of said membrane wall pairs, and plate members positioned between adjacent membrane wall pairs for support thereof, and to define a second set of flow passages along exterior surfaces of said membrane wall pairs, and means for permitting communication of said flow passages with the exterior of said device, said means including flow conduits extending transversely of said stack in communication with one set of said flow passages, the improvement comprising: staging means for directing fluid in at least one of said sets of flow passages successively along different membrane wall pairs, to lengthen the fluid flow path through said flow passages for improved diffusion, said staging means comprising intact, port-free surfaces of membrane walls in registry with said transversely extending flow conduits, positioned to occlude flow at predetermined intervals along said transversely extending flow conduits and to redirect flow received from along one membrane wall pair along another membrane wall pair.

2. The diffusion device of claim 1 in which said set of first flow passages communicates, adjacent opposite membrane wall ends and plate ends, with a pair of said transversely extending flow conduits, each conduit being disposed at a said opposite end, and a plurality of port-free membrane walls are defined at preselected positions along each said flow conduit, said port-free membrane walls being alternatingly positioned at opposite ends of different, spaced membrane walls, to define a flow path of zig-zag shape through said diffusion device.

3. The diffusion device of claim 2 in which said transversely extending flow conduits are defined by first open ports defined through said plate members and membrane walls.

4. The diffusion device of claim 3 in which said port-free membrane walls are spaced from each other by a plurality of port-defining membrane walls, to provide a flow path through said diffusion device which comprises a plurality of separate, first flow passages within different membrane pairs in parallel flow arrangement.

5. The diffusion device of claim 4 in which said second set of flow passages communicates, adjacent opposite membrane ends and plate ends, with a second pair of transversely extending flow conduits, each said conduit being disposed adjacent a said opposite end, and a second plurality of port-free membrane walls positioned to occlude said transversely extending flow conduits, said port-free membrane walls being alternatingly positioned at opposite ends of different, spaced membrance walls to define a second flow path of zig-zag shape through said diffusion device.

6. The diffusion device of claim 5 in which the second plurality of port-free membrane walls are spaced from each other by a plurality of port-defining membrane walls, to provide a second flow path through said diffusion device which comprises a plurality of separate second flow passages along separate membrane pairs in parallel flow arrangement.

7. The diffusion device of claim 6 in which said plate members are profiled on both sides, with fluid conducting flow channels extending generally longitudinally along said plate members, and disposed in an alternating stack of single plates and membrane wall pairs.

8. The diffusion device of claim 7 in which said flow channels are interrupted by transversely extending flow equalization grooves defined in said plate members.

9. The diffusion device of claim 8 in which said plate members are unitary, non-porous structures.

10. The diffusion device of claim 9 in which each second set of flow passages sealingly communicates at each plate member end with said second, transversely extending flow conduits through sealing channel means, which last named means comprises: sealing shoulders on both sides of said plate member; flow grooves defined on each side of said plate member in said sealing shoulders, said grooves communicating at one end thereof with a second transversely extending flow conduit; a flow aperture at the other end of each flow groove extending through said plate and providing fluid communication with the fluid conducting flow channels on both sides of said plate member, and a sealing member bridging each flow aperture to present a sealing surface which is generally coplanar with said sealing shoulder on that side of the plate member to which the connecting flow groove of the bridged flow aperture opens, said flow grooves and sealing members on opposite plate sides and the same plate ends being asymmetrically arranged relative to each other, and positioned to avoid abutment against the corresponding parts of adjacent plates in the stack.

11. A diffusion device comprising a stack of identical plate members and pairs of semi-permeable membrane walls between said plate members, said plate members each having a profiled surface on both sides thereof for providing channels for flow of fluid longitudinally along said plate members, and said plate members having sealing channel means disposed at opposite ends of said plate members for sealing fluid communication between said profiled surfaces, and said plate members having port means communicating with the exterior of said stack, said sealing channel means being defined by sealing shoulders disposed at the edges of each of said plate members on both sides thereof, and said plate members each having flow grooves defined on each side thereof in said sealing shoulders communicating at one end with said port means, a flow aperture connected at the other end of each flow groove, said aperture extending through said plate and providing flow communication with the channels of said profiled surface on both sides of said plate member, and a sealing member bridging each aperture to present a sealing surface which is generally coplanar with said sealing shoulder on the side of the plate member to which the connecting flow groove of the bridged flow aperture opens, said flow grooves and sealing members on opposite plate sides and at the same plate ends being asymmetrically arranged relative to each other and said plate to avoid abutment against the corresponding parts of the adjacent, identical plate member in said stack.

12. The diffusion device of claim 11 wherein said plate members are each a unitary, non-porous structure.

13. The diffusion device of claim 12 in which said port means is defined by open ports in each of said plates in registry with one another and with membranes in said stack to provide a port passage for access to the exterior of said stack.

14. The diffusion of claim 13 in which said flow channels of said profiled surface are interrupted by transversely extending flow equalization grooves defined in said plate members.

15. The diffusion device of claim 13 in which said plate members define interlocking stud and recess means to prevent stacking of said plate members in other than consecutively inverted relation.

* * * * *